United States Patent [19]

Li et al.

[11] Patent Number: 4,918,635

[45] Date of Patent: Apr. 17, 1990

[54] ULTRAFAST DIGITAL PHOTONIC SIGNAL PROCESSING USING OPTICAL NONCOLLINEAR SECOND HARMONIC GENERATION

[76] Inventors: Yao Li, 3605 Sedgwick Ave., #B22; Robert R. Alfano, 3777 Independence Ave., both of Bronx, N.Y. 10463; George Eichmann, 18 Arbor La., Roslyn Heights, N.Y. 11577

[21] Appl. No.: 271,566

[22] Filed: Nov. 15, 1988

[51] Int. Cl.[4] .......................... G06F 7/56; G06G 7/16

[52] U.S. Cl. .................................... 364/713; 364/754; 364/845; 307/427

[58] Field of Search ................ 364/713, 754, 841-843, 364/845; 350/96.11, 96.19; 307/425, 427; 341/137

[56] References Cited

U.S. PATENT DOCUMENTS

| | | | |
|---|---|---|---|
| 4,330,721 | 5/1982 | Hauck et al. | 307/425 |
| 4,556,950 | 12/1985 | Tai et al. | 364/713 |
| 4,592,004 | 5/1986 | Bocker et al. | 364/754 |
| 4,617,666 | 10/1986 | Liu | 307/427 |
| 4,628,473 | 12/1986 | Weaver | 364/845 |
| 4,633,427 | 12/1986 | Bocker | 364/845 |
| 4,705,397 | 11/1987 | Tsuchiya et al. | 307/427 |
| 4,763,019 | 8/1988 | Duguay et al. | 307/427 |
| 4,767,197 | 8/1988 | Yeh | 364/845 |
| 4,797,843 | 1/1989 | Falk et al. | 364/713 |

*Primary Examiner*—Gary V. Harkcom
*Assistant Examiner*—Dale M. Shaw
*Attorney, Agent, or Firm*—Irving M. Kriegsman

[57] ABSTRACT

A technique for performing multiplication oriented optical digital computations in which a pair of identical primary frequency coherent beams of light are directed off-axis through a second harmonic generating crystal to produce an on-axis frequency doubled (i.e. second harmonic) output signal. Each primary beam is encoded with one of the quantities to be multiplied producing an output beam containing the product of the two quantities. The output beam is detected by an array type detector. The technique can be used in performing time integration applications as well as spatial integration applications. For space integration applications a cylindrical lens is positioned in front of the array detector. Multistage operations are realized using a parameteric frequency down conversion and amplification scheme.

2 Claims, 6 Drawing Sheets

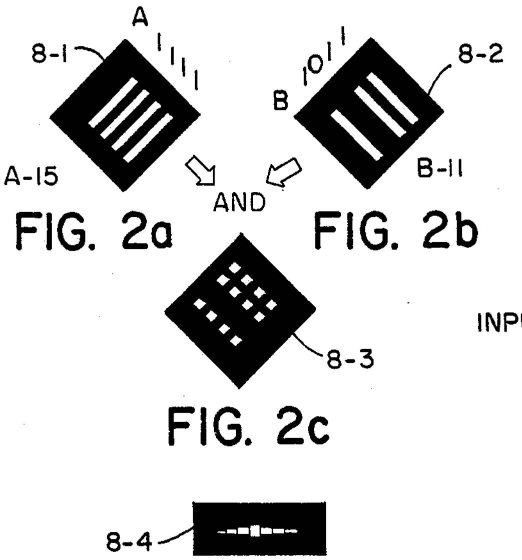
FIG. 2a
FIG. 2b
FIG. 2c
FIG. 2d
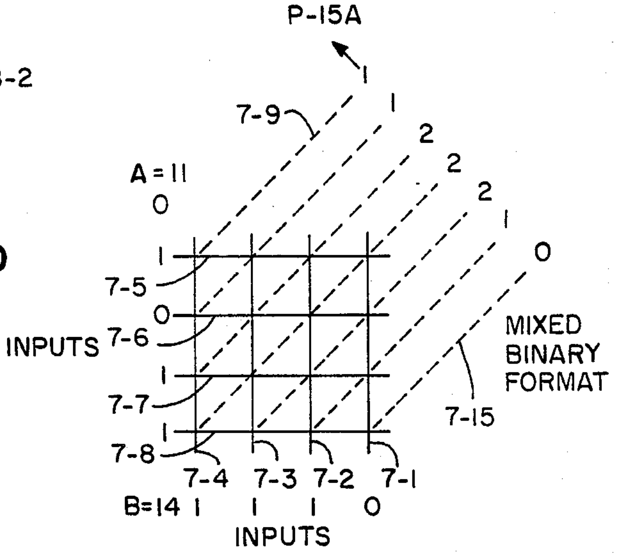
FIG. 1
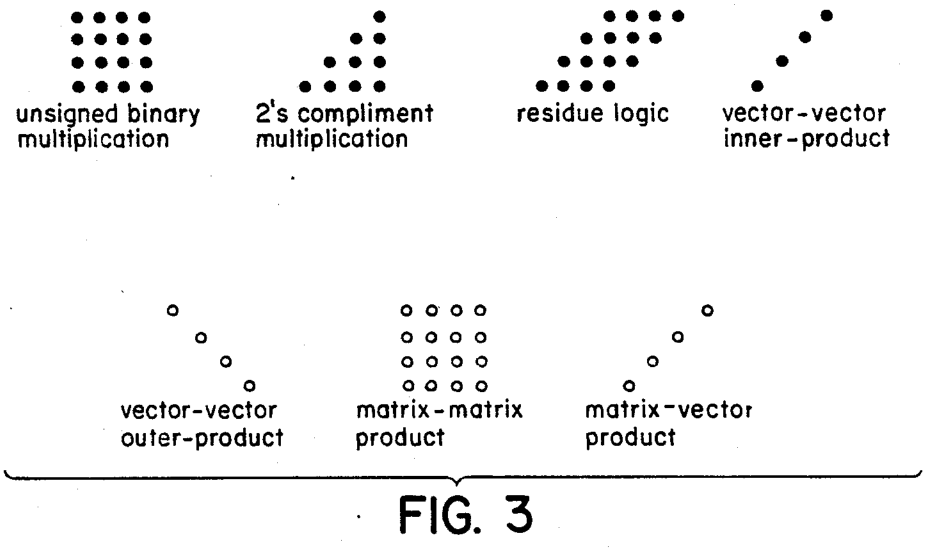
FIG. 3

C=123321

ULTRAFAST DIGITAL PHOTONIC SIGNAL PROCESSING USING OPTICAL NONCOLLINEAR SECOND HARMONIC GENERATION

BACKGROUND OF THE INVENTION

The present invention relates generally to digital signal processing and more particularly to digital signal processing using optical noncollinear second harmonic generation.

When two noncollinear identical optical beams pass through a second harmonic generating (SHG) crystal, such as KDP, depending on the beam propagation geometry for a 90 degree phase-matching, a frequency-doubled (i.e. second-harmonic or SH) output signal NSHG can be generated. The noncollinear second harmonic generated output signal NSHG emerges with an angle that bisects the intersection angle $\phi$ of the two input beams. When pulsed inputs are used, the NSHG signal spatial profile represents the input temporal autocorrelation function. Since the NSHG signal can have a femtosecond response, and since the input/output frequencies are well separated and the phase matching condition acts as an angular filter, NSHG has widely been used in the past as a background free detection method for measuring temporal information down to as low as about 8 femtoseconds.

An NSHG device can be viewed as an optical Boolean logic AND gate, i.e. a SH output is generated only when both fundamental inputs are present. Using either frequency or polarization filtering, the NSHG output signal can easily be isolated.

The present invention as will hereinafter be described is based on the discovery of the application of a noncollinear second harmonic generated (NSHG) switch array element-based network to various ultrafast parallel all optical digital signal processing computations. These computations, range from binary scalar to vector multiplications, from matrix-vector to matrix-matrix multiplications, as well as from residue addition/subtraction to multiplication mapping operations, etc. In general, this NSHG-based computing network is suitable for but not limited to any application where a large number of parallel AND operations are required.

In many digital computation applications, arrays of a large number of AND gates are needed. For example, to perform either digital multiplication or digital convolution/correlation of two N-bit binary numbers, as many as N AND operations are used. For the fast multiplication, it is preferred to implement these AND functions in parallel. Because of inherent problems associated with electronic circuitry, the fastest AND gate speed is limited to the order of nanoseconds. There are technologies, using nonlinear optical etalons, to perform faster parallel AND switching. However, using any known nonlinear material, the size of the multi-reflection etalon cavity can not be made small enough to perform femtoseconds AND operation. On the other hand, a NSHG crystal has a femtosecond response so that for some AND-based special purpose computations where processing speed is the highest priority, it is an optimum device.

For performing digital optical multiplication, the existing digital multiplication via analog convolution (DMAC) method uses two processors: a convolver that performs either a time-integrating or a space-integrating binary convolution and an analog-to-digital (A/D) converter that converts the convolution result from a mixed-binary representation (MBR) to a binary output. In the present invention based on an NSHG AND gate array, two, one for time-integrating and another for space integrating ultrafast, all-optical DMAC schemes are presented.

Accordingly, it is an object of this invention to provide a new and improved technique for performing multiplication oriented type signal processing operations.

SUMMARY OF THE INVENTION

A technique for performing multiplication oriented optical digital computations according to the teachings of this invention includes a pair of identical primary frequency coherent beams of light. The two beams are directed off-axis through a second harmonic generating crystal to produce an on-axis frequency doubled (i.e. second harmonic) output signal. Each primary beam is encoded with one of the quantities to be multiplied producing an output beam containing the product of the two quantities. The output beam is detected by an array type detector. The technique can be used in performing time integration and well as spatial integration computations. For space integration applications a cylindrical lens is positioned in front of the array detector. Multistage operations are realized using a parametric frequency down conversion and amplication scheme to convert the second harmonic signal back to its primary frequency after each stage.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is a schematic representation of a 4-bit NSHG-based unsigned binary optical convolver according to this invention;

FIGS. 2 (*a*) through 2(*d*) is a schematic representation of an NSHG based space integrating scalar-scalar multiplication scheme;

FIG. 3 is a table summarizing various operations that can be performed according to this invention;

DETAILED DESCRIPTION OF PREFERRED EMBODIMENTS

Figure 4:
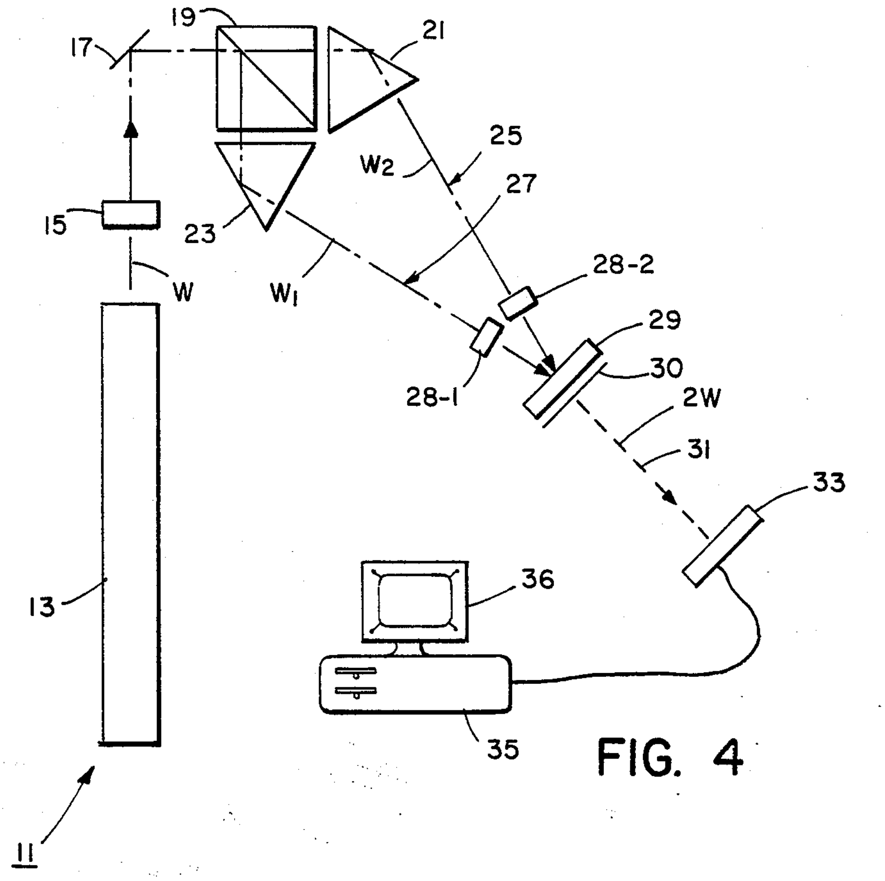
FIG. 4 is a diagram of one embodiment of an apparatus for implementing the invention.

The present invention is directed to the idea of using optical noncollinear second harmonic generation to perform various multiplication oriented type computations. These computations include binary unsigned scalar and vector multiplication, binary matrix-vector and matrix-matrix multiplications as well as residue arithmetic operations.

Referring now to FIG. 1, a schematic representation of a time-integrating 4-bit NSHG-based scalar-scalar multiplication scheme is shown. The inputs are marked with solid lines 7-1 to 7-8 and the outputs with dashed lines 7-9 to 7-15. The two decimal numbers to be multiplied in the example shown are A=11 and B=14. Their equivalent binary numbers are A=1011 and B=1110. The two spatially coded four channel binary numbers A and B arrive from the left and bottom part of the network. Since at each intersection an AND operation is performed, and since all sixteen AND outputs are automatically aligned into seven output spatial channels, a time integration of these SH output pulses yields the partial product C=1122210. This MBR output corresponds to the decimal number C=154.

Using the NSHG based time-integrating processor for the multiplication of two N-bit inputs with bit spacing D and size d, a crystal thickness L is required, where $$L = \frac{D(N-1)+d}{\tan\phi/2}$$

Since the time interval, in the same channel, between two consecutive SH output pulses is the travel time difference between the input and the SH signals for the two autochannelized AND gates, the multipication cycle time T, for two N-bit numbers is $$T = \frac{(N-1)DM_o(\lambda)\sin\phi/2}{c}$$

where c is the velocity of light in vacuum. With a KSP crystal and input wavelength $\lambda=1064$ nm, $\phi=20.3$, $\eta(\lambda)=1.494$, and choosing $D_1=1$ mm, the multiplication time for two unsigned 32 bit numbers is about 28 ps. The actual multiplication cycle time depends on the input pulse duration. Since the temporal width of an SJ pulse is always shorter than the primary, the use of ultrashort laser pulses can lead to parallel, ultrafast processing down to femtoseconds.

It is also possible to implement an ultrafast NSHG-based space-integrating DMAC processor, for an NSHG-based space-integration processing scheme. This is shown in FIGS. 2(*a*) through 2(*d*). As can be seen, the two numbers are encoded into two perpendicular light bar arrays 8-1 and 8-2. The two arrays are directed to a thin second harmonic generating SHG crystal (not shown) which generates a second harmonic SH dot array 8-3 (see FIG. 2(*c*)). To form the MBR multiplication result, an additional space-integration cylindrical lens (not shown) is used along a 45 degree direction. In the lens back focal plane, the intensity of the space-integrated result 8-4 (see FIG. 2(*d*) for a slightly defocused example) represents the final result.

In addition to binary scalar multiplication, the NSHG based ultrafast optical processing scheme of this invention can also be used for optical binary vector and matrix multiplication operations. The matrix and vector to be multiplied are encoded as the primary frequency light dot and bar arrays, respectively. The mix of the two inputs in the second harmonic generating SHG crystal generates the partial product to be space-integrated. Again, by using a cylindrical lens but aligned along a vertical direction with respective to the input light bar array, the space-integrated multiplication result is generated. It can be shown that this NSHG based ultrafast processing scheme can be used for any optical digital operation where a large number of parallel, ultrafast optical AND operations are required. The applications include optical digital vector inner- and outer-product generation, matrix-vector and matrix-matrix multiplication, residue mapping as well as cross-bar random access array switching. In the table in FIG. 3, these operations together with their possible NSHG-based optical implementations are summarized. The dot and circle represent 2 and 3-D AND switch arrays, respectively. The parallel input data enter from the left and the bottom of the network.

To demonstrate the operational principle of this invention, a number of ultrafast NSHG optical processing experiments have been performed.

Figure 5:
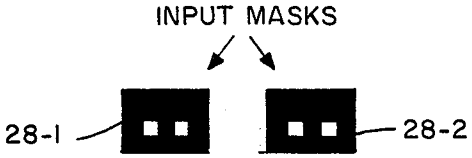
FIG. 5 is a plan view of the two masks in the apparatus in FIG. 4.

One arrangement of an apparatus 11 according to this invention for performing an NSGH time integrating processing is shown in FIG. 4. A passively modelocked Nd glass laser 13 which generates a train of picosecond 1064 nm pulses was employed as the light source. A 17 picosecond pulse from the trailing edge of the pulse train was selected and spatially expanded by an expander 15 (to 20 mm in diameter) deflected off a 45 degree mirror 17 and split into two parts by a beamsplitter 19. Using a pair of 60 degree prisms 21 and 23, the two identical frequency and path length beams 25 and 27 were passed through a pair of masks 28-1 and 28-2 and into a $15\times15\times9$ $mm^3$ z-cut KDP crystal 29. For a 90 degree phase-match, the incident angles $a^1$ and $a_2$ of the two beams were +15.1 degree measured in air. After filtering out residue 1064 nm signals with a filter 30, the SH signal (i.e. the output beam 31 was detected by a 2D CCD array 33 controlled by a computer 35. The detected SH beam profile was displayed on a monitor 36 and stored for further analysis in computer 35. To obtain a somewhat uniform beam profile for an accurate array processing, only the center portion (about 6.5 mm in diameter) of the SH output profile was used. Using a synthetic spatially variable absorption mask, (not shown) further spatial intensity compensation was performed. Each mask 28 contained a pattern of pixels corresponding to one of the quantities to be processed (See FIG. 5).

Figure 7:
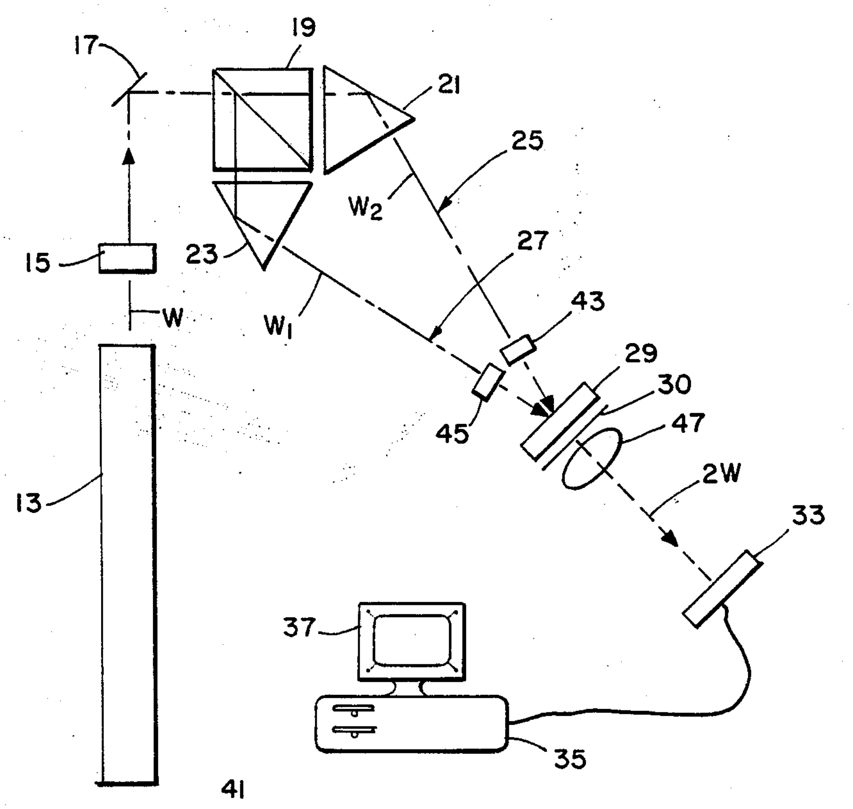
FIG. 7 is a diagram of another embodiment of an apparatus for implementing the invention.
Figure 6:
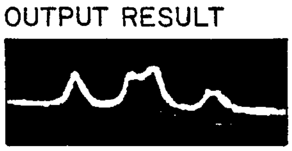
FIG. 6 is an oscilloscope trace showing the result obtained using the masks in FIG. 5 in the apparatus in FIG. 4.
Figure 8:
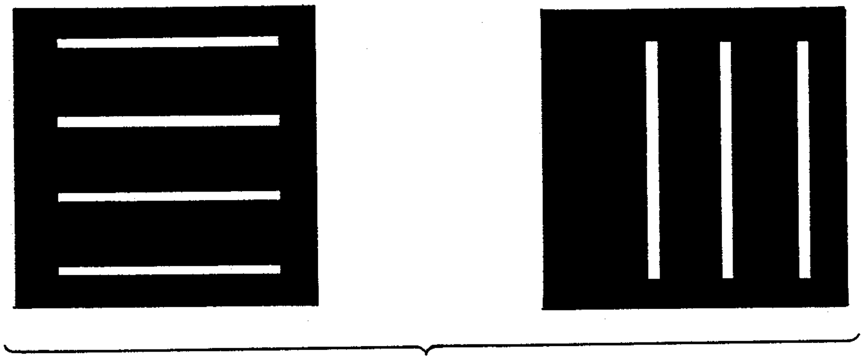
FIG. 8 is a plan view of the two masks in the apparatus in FIG. 7.
Figure 9:
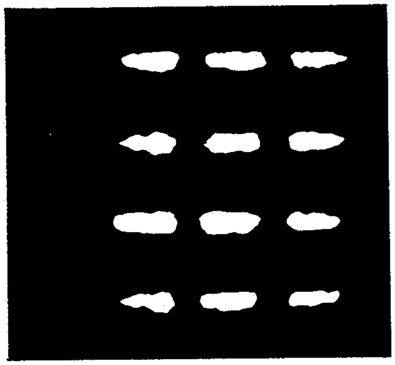
FIG. 9 is a plan view of the output dot array produced in the apparatus in FIG. 7.
Figure 10:
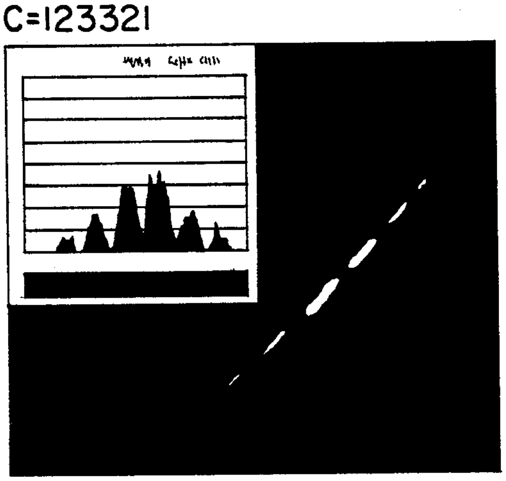
FIG. 10 is a representation of the CCD camera result in the FIG. 7 embodiment along with the computer readout value.

To ensure the correct overlap the pixel width and spacing were chosen as 0.5 mm and 1.2 mm, respectively. With the input pixels open corresponding to binary numbers A-11, and B-11 a 3-bit time integrated NSHG output with intensity levels (1,2,1) was observed. In FIG. 6, an oscilloscope trace showing the experimental result is illustrated. Since for KSP is only 20.2 degree, it is difficult to process more parallel digits. To process longer bit strings, crystals with larger $\phi$, such as $LiLO_3$ ($\phi=39.4°$ at $\lambda=1064$ nm), should be used.

for implementing a space integrating scheme, a 4-bit NSHG DMAC experiment was performed. The apparatus 41 is shown in FIG. 7. The two input number A-111 and B=0111 (corresponding to decimal 15 and 7) were spactially encoded into two masks 43 and 45 which are shown in plan view in FIG. 8. Here, the slit width and spacing were 1-0.4 mm and 1-2.0 mm, respectively. In FIG. 9, the generated SH, output dot array is shown. While the row width was identical to the horizontal input slit width, the column width was expanded to four times as large as the input vertical slit width. This is because when the primary beams traverse the crystal, they generate the SH signal in a different, a bisecting angle direction. Thus, the SH output width is equal to a product of the crystal thickness as the tangent of the primary beam incident angle. To form the DMAC result of A and B, an f=50 mm cylindrical lens 47 was used at the crystal's output side. Cylindrical lens 47 was oriented along a 45 degree direction to convert the generated 2D 4×3 dot array into a 1D dot array. In FIG. 10, both the CCD result and its computer read-out value C=A×B=123321 (corresponding to a decimal 105) are shown.

Finally, an optical space-integrating matrix-vector multiplication experiment was also experimentally realized using the setup shown in FIG. 7. The example used was a matrix vector as shown below:

$$\begin{vmatrix} 1 & 0 & 0 & 1 \\ 0 & 1 & 1 & 1 \\ 1 & 1 & 0 & 1 \\ 1 & 0 & 1 & 1 \end{vmatrix} \begin{vmatrix} 1 \\ 0 \\ 1 \\ 0 \end{vmatrix} = \begin{vmatrix} 1 \\ 1 \\ 1 \\ 2 \end{vmatrix}$$

Figure 11:
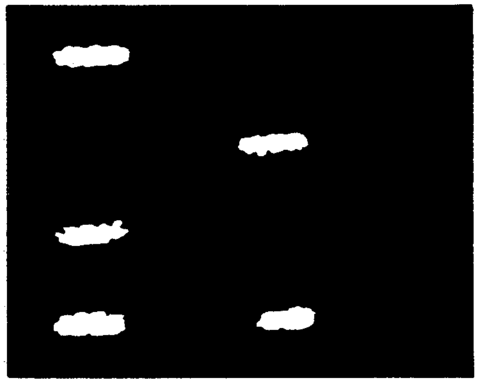
FIG. 11 is the result obtained for a matrix-vector multiplication process.
Figure 12:
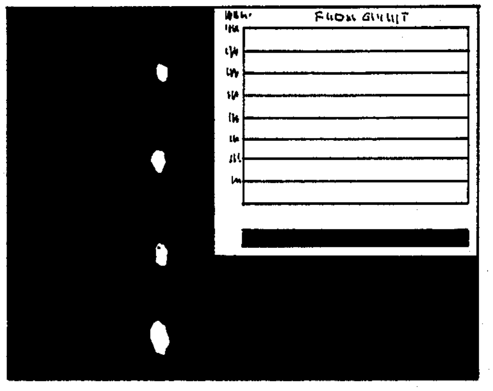
FIG. 12 is the converted intensity result and computer readout value for the result shown in FIG. 11.

The same bit size and spacing was used. While the vector was represented by an array of vertical slits the matrix was represented as an array of square holes. After inserting the two masks into the input beams, their Sh intensity multiplication result was obtained (see FIG. 11). To convert this result into a column vector output form, the same cylindrical lens 47 was used. The converted intensity result and its computer readout value are shown in FIG. 12.

Figure 13:
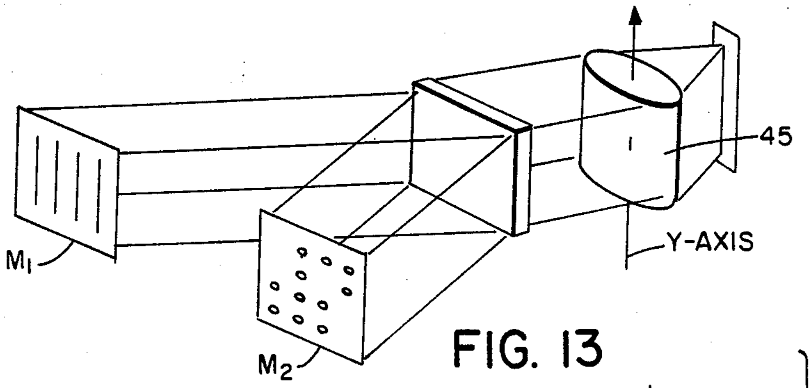
FIG. 13 is a view showing the basic arrangement of the two masks, the crystal, the lens and the detector array for a matrix-vector spatial integration type setup.
Figure 14:
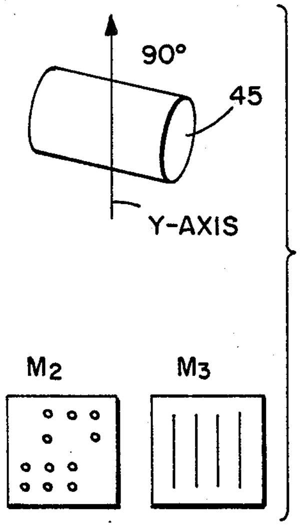
FIGS. 14 through 16 show how the lens is rotated and the change in mask construction for a vector-matrix multiplier, a binary convolution and a binary correlation setup; respectively
Figure 15:
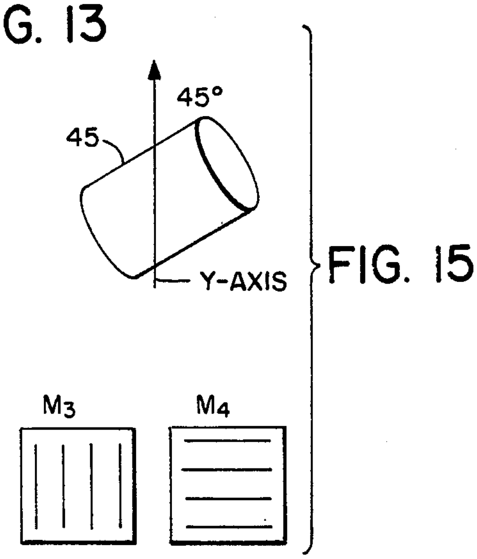
Figure 16:
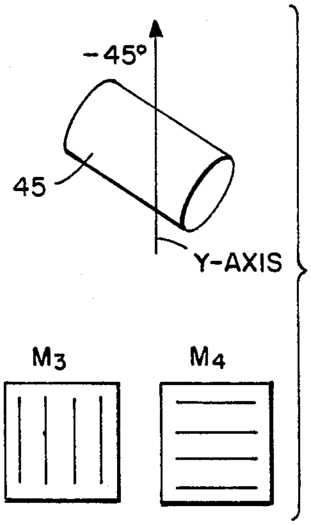

The orientation of cyclindrical lens 47 in various arrangements for performing spatial integration can be more clearly understood by reference to FIGS. 13 through 16. FIG. 13 shows the basic arrangement of the two masks $M_1$ and $M_2$ for encoding the two beams, the SHG crystal 29, the lens 47 and the detector array 33 for a matrix-vector multiplication. FIG. 14 shows the two masks $M_3$ and $M_2$ and lens 45 orientation for a vector matrix multiplier operation. FIG. 15 shows the two masks $M_3$ and $M_4$ and the lens 45 orientation for a binary convolution and FIG. 15 the corresponding setup for a binary correlation operation.

Figure 17:
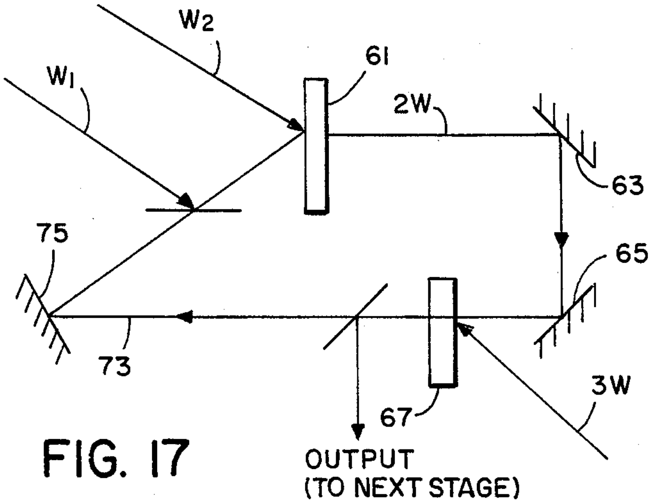
FIG. 17 is a schematic of an NSHG system which includes parametric down conversion.

For multi-stage operations, the second harmonic signal SH is converted back to its fundamental frequency after each stage. A parametric frequency down-conversion and amplification scheme can be employed to achieve this result. It is well known, that to convert and amplify a weak SH signal back to its fundamental frequency and power using a parametric scheme, a strong third-harmonic (TM) pump beam is needed. The TH power density may be determined from the equation.

$$\frac{P}{A} = \frac{1}{8} \frac{\eta_1\eta_2\eta_3}{d_{1f}^2} \frac{(\epsilon_0 C)^3 g^2}{\omega_1\omega_2}$$

where the subscripts 1, 3 and 2 denote the weak SH, the strong TH input and the amplified idler output signals, while g and d are the crystal gain and the second order nonlinarity, respectively. To convert and amplify SH signals from 6% back to 100% power using a 1 cm thick $LiNbO_3$($d=5\times10^{21}$ MKS) cell, about 50 $MW/cm^2$ pump power density is needed. To decrease this power density, a higher figure of merit M ($M=d^2/n$) crystal, such as an organic NPP [15]or a KNbO[16]crystal (where M is an order of magnitude larger than $LiNbO_3$) can be used. A system for achieving this is shown in FIG. 17.

Two input beams $\omega_1$ and $\omega_2$ which are encoded with information to be processed are fed into a SHG crystal 61. The output beam 62 containing the encoded result of the processing and which is at a frequency $2\omega$ is deflected off a pair of 45 degree mirrors 63 and 65 and then fed into a parametric conversion crystal 67 along with a $3\omega$ beam. The output beam which is $\omega_3$ and contains the encoded result is deflected off a mirror 69 and sent to the next stage along path 71 in a cascading arrangement. Alternately, beam $\omega_3$ may be sent around the same loop again along path 73, off mirror 75 changing the encoding appropriately so that each time around beam $\omega_3$ is fed into crystal 61 with beam $\omega_2$ encoded as before or differently. For convenience both setups are shown in FIG. 17.

Figure 18:
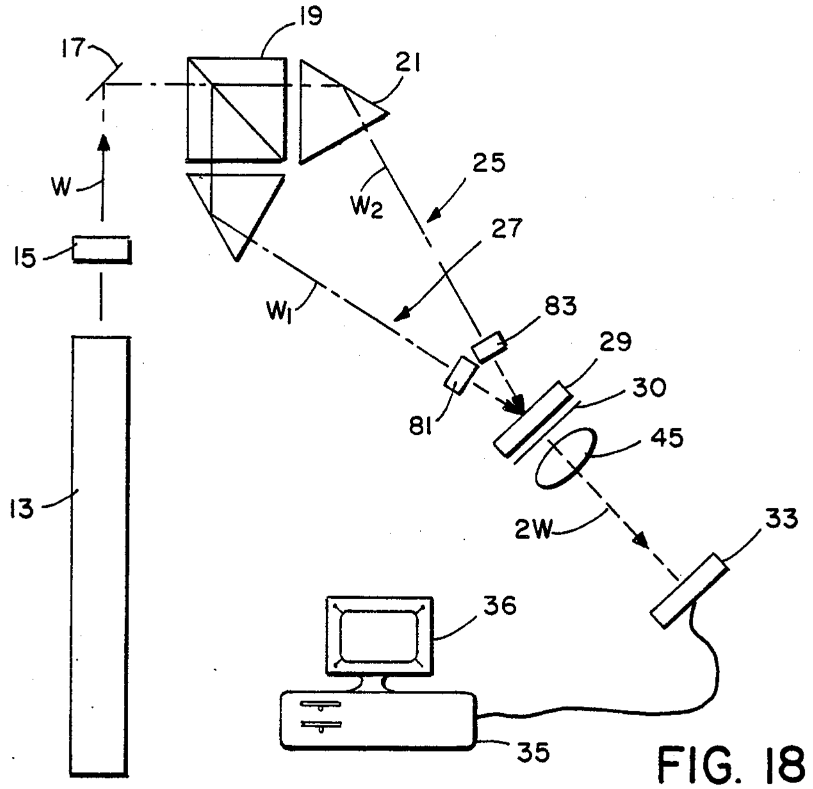
FIG. 18 is a view of a modification of the invention.

For real time operations, each one of the masks in FIGS. 4 and 7 could be replaced by an all optical etalon array or a two dimensional spatial light modulator such as a multichannel acousto-optic cell or an electro-optic modulator FIG. 18 shows a modification with two spatial ligh modulators identified by reference numerals 81 and 83.

Figure 19:
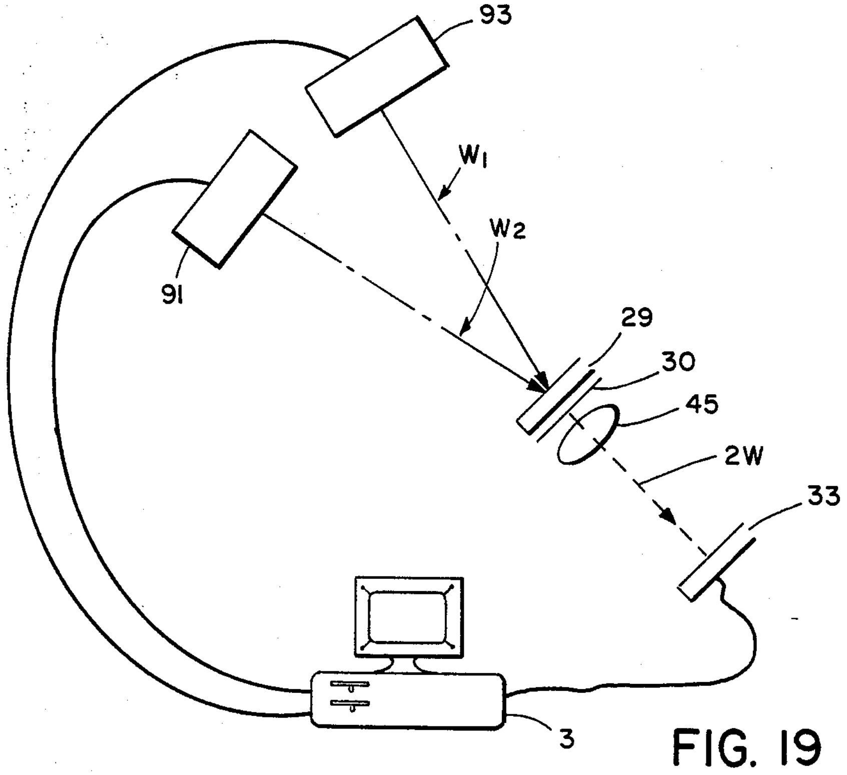
FIG. 19 is a view of another modification of the invention.

Also, the input beam and two masks could be replaced by two computer controlled arrays of optical coherent light sources 91 and 93 such as shown in FIG. 19.

What is claimed is:

1. A method of multiplying two quantities optically comprising:

a. providing a second harmonic generating crystal, b. providing a pair of identical primary frequency coherent beams of light, one of the beams being encoded with one of the quantities and the other beam being encoded with the other quantity, c. directing the pair of beams off-axis into said second harmonic generating crystal so as to produce an on-axis frequency doubled beam of light, the frequency doubled beam of light being encoded with the product of the two quantities, and d. detecting the frequency doubled output beam.

2. Apparatus for performing multiplication type operations two quantities optically comprising:

a. a second harmonic generating crystal, b. means for providing a pair of identical primary frequency coherent beams of light, one of the beams being encoded with one of the quantities and the other beam being encoded with the other quantity, said c. pair of beams being directed off-axis into said second harmonic generating crystal so as to produce an on-axis frequency doubled beam of light, the frequency doubled beam of light being encoded with the product of the two quantities, and d. means for detecting the frequency doubled output beam.

* * * * *